(12) United States Patent
Bartolo et al.

(10) Patent No.: US 7,592,788 B2
(45) Date of Patent: Sep. 22, 2009

(54) CONTROL DEVICE OF A SWITCHING CONVERTER WITH OVERCURRENT PROTECTION CIRCUIT AND RELATED SWITCHING CONVERTER

(75) Inventors: Vincenzo Bartolo, Milan (IT); Dennis Marelli, Cantu' (IT); Francesco Griseta, Como (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 415 days.

(21) Appl. No.: 11/553,090

(22) Filed: Oct. 26, 2006

(65) Prior Publication Data

US 2007/0097578 A1 May 3, 2007

(30) Foreign Application Priority Data

Oct. 27, 2005 (IT) .......................... MI2005A2051

(51) Int. Cl.
*G05F 1/569* (2006.01)
(52) U.S. Cl. ....................................... 323/276; 323/282
(58) Field of Classification Search ................. 323/266, 323/276, 282, 283, 284, 351; 361/18, 93.1
See application file for complete search history.

(56) References Cited

U.S. PATENT DOCUMENTS 7,221,129 B2 * 5/2007 Matsuo et al. ............... 323/222
7,368,898 B2 * 5/2008 Sutardja et al. ............. 323/285

* cited by examiner

*Primary Examiner*—Adolf Berhane
(74) *Attorney, Agent, or Firm*—Hogan & Hartson LLP

(57) ABSTRACT

A control device of a switching converter having an input terminal, an output terminal and a semi-bridge of a first and second transistor coupled between the input terminal and a reference voltage, includes a first circuit for detecting a signal representative of the signal on the converter output terminal and able to compare it with a reference signal and to emit a first signal in response to the comparison. The control device drives the first and second transistors based on the first signal and includes a protection circuit to detect the presence of overcurrents in the semi-bridge and acting upon the first and second transistors in response to the detection. The control device includes a second circuit for acting upon the first circuit in order to level the value of the first signal after the triggering of the protection circuit.

19 Claims, 4 Drawing Sheets

CONTROL DEVICE OF A SWITCHING CONVERTER WITH OVERCURRENT PROTECTION CIRCUIT AND RELATED SWITCHING CONVERTER

RELATED APPLICATION

The present application claims priority of Italian Patent Application No. MI2005A002051 filed Oct. 27, 2005, which is incorporated herein in its entirety by this reference.

FIELD OF THE INVENTION

The present invention relates to a control device of a switching converter with an overcurrent protection circuit and the related switching converter.

BACKGROUND OF THE INVENTION

Switching converters such as the buck converter shown in FIG. 1 are generally known in the current state of the art. Said converter comprises an MOS transistor 1 having a non-drivable terminal connected to an input voltage Vin and another non-drivable terminal connected to the cathode of an asynchronous rectifier diode D1 having its anode connected to ground GND; the transistor 1 is driven by a control device 2. The cathode of the diode D1 is connected to a low-pass filter comprising an inductor L and a capacitor C from whose ends the converter output voltage Vout is drawn.

In conditions of operation with the continuous conduction mode (CCM). that is when the current in the inductor L never goes to zero, and with a resistive type of load LOAD, if the transistor I has an "on" time Ton and an "off" time Toff, where T=Ton+Toff, it follows that Vout=D*Vin where D is the duty cycle given by D=Ton/T. In conditions of operation with the discontinuous conduction mode (DCM), that is when the current in the coil goes to zero during the switching period, the output voltage Vout is a function of the value of the inductor L, time period T, duty cycle D and input voltage Vin, i.e., $$Vout = \frac{2Vin}{1 + \left(1 + \frac{8L}{RT} * \frac{1}{D^2}\right)^2}$$

where R is the resistive value of the load LOAD.

Another buck converter layout is shown in FIG. 2. The converter comprises a first MOS transistor HS having a non-drivable terminal connected to the input voltage Vin and another non-drivable terminal P connected to a terminal of the inductor L and a non-drivable terminal of a second MOS transistor LS connected to ground GND. The other terminal of the inductor L is connected to the capacitor C, having its other terminal connected to ground GND; the capacitor C is placed in parallel with the load LOAD and a resistive divider comprising a series of two resistors, R1 and R2. A fraction MFB of the output voltage Vout is input to a control device 20. The transistors HS and LS are switched on in a push-pull mode and as a result there is a lower power dissipation, given that the voltage drop across the transistor LS is lower than the voltage drop on the diode.

The control device 20 comprises a first circuit 24 comprising in turn an error amplifier 26 for comparing the voltage VFB with a reference voltage Vref and means able to effect a pulse width modulation (PWM) in response to said comparison. The control device 20 comprises two drive circuits or drivers 21 and 22 receiving as inputs the PWM signals output by the circuit 24 and able to drive the transistors HS and LS via the signals HSIDE and LSIDE. The driver 22 is powered by a voltage Vccdr whereas driver 21 is powered by a voltage Vcb originating from a bootstrap circuit 23 comprising a capacitor Cboot situated between the node P and the cathode of a diode Dcb having its anode connected to the voltage Vccdr.

When the converter is switched on, the node P is grounded GND and the capacitance Cboot is charged to the voltage Vccdr−Vd where Vd is the voltage drop of the diode Deb. When a pulse arrives from the PWM signal output by the circuit 24, the driver 21 starts to charge the gate of the transistor HS, supplying a charge Q drawn from the capacitance Cboot. When the transistor HS is switched on, the node P is brought to the voltage Vin and the voltage Vcb is forcibly brought to the voltage Vin+Vcboot where Vcboot is the voltage at the ends of the capacitor Cboot. In this condition the driver 21 supplies a voltage to the gate of the transistor HS that is sufficient to keep it on. The switching cycle concludes with the switching off of the transistor HS, whose gate is brought to the voltage of the node P. When the transistor LS is switched on, the node P is again brought to ground GND and the capacitance Cboot is thus recharged via the diode Dcb.

In order to prevent that in particular malfunction conditions the current carried by the transistors may rise to such a point as to damage or break them, overcurrent protection circuits are included in the regulators. There are a variety of devices able to implement overcurrent protection. Said devices include means capable of sensing the current that flows in the transistor or in the inductor L. Overcurrent protection is usually introduced in order to be able to guarantee a current limit even with switch-on times Ton shorter than the minimum time necessary for obtaining a reliable reading of the current in the transistor HS. Because of the noise due to parasite components and to the switching operations of the transistors, a masking interval (Tmask) is introduced in the current detection. Within this interval of time immediately after switching, no overcurrent is considered. It follows that in the case of switch-on times Ton shorter than Tmask any occurring overcurrent would be ignored, for this reason a reading of the current on the transistor LS is introduced.

When an overcurrent occurs there are various possibilities for intervention to avoid damage to the device or application. One of said possibilities is to implement a protection device on the constant current, which once the threshold current IL_TH has been fixed, acts upon the circuit 24 in such a way as to maintain on the inductor a constant peak current equal to the value of the predefined threshold current.

The overcurrent protection in the constant current mode is implemented using a reading on the transistor HS or on both transistors, HS and LS. In the latter case, when an overcurrent is detected during the switch-off time Toff, the transistor LS is kept on for as long as said condition persists and the transistor HS is never switched on, as occurs with the device 27 of FIG. 2. This implies that no switch-on pulses will be considered for the transistor HS in order to guarantee the current limit. In such conditions it is possible to guarantee overcurrent protection between duty cycles of almost nil and duty cycles close to 100%.

Said type of protection may cause a loss of cycles and the converter may in such a case operate at a subharmonic frequency giving rise to a strong output ripple DIripple where $$DIripple = \frac{Vin - Vout}{L} Tmask.$$

In the case of large conversion ratios and a low value filter inductor, the converter may operate with a peak current ILpeak in the inductor exceeding the threshold current IL_TH and a lower working frequency, as is shown in FIG. 3.

In converters equipped with an overcurrent protection device like the ones previously described, at the end of the load transition that triggers said protection, an undesired over-elongation may occur in the output voltage Vout. In fact, during the action of the protection device, the output voltage Vout falls to a value below the regulation value and the error amplifier output saturates high, given that the feedback signal VFB is at a lower value than Vref. On coming out of said condition the converter will function with elevated duty cycles causing potential over-elongations of the output voltage Vout.

SUMMARY OF THE INVENTION

In view of the current state of the art, the object of the present invention is to provide a control device for a switching converter with an overcurrent protection circuit that overcomes the aforesaid drawbacks.

According to the present invention this object is achieved by means of a switching converter control device having an input terminal and output terminal. The converter includes a semi-bridge of a first and second transistor coupled between the input terminal and a reference voltage. The control device includes first means capable of detecting a signal representative of the signal on the converter output terminal and able to compare it with a reference signal and to emit a first signal in response to said comparison. The control device is suitable for driving said first and second transistors based on said first signal, and comprises a protection circuit able to detect the presence of overcurrents in said semi-bridge and capable of acting upon said first and second transistors in response to said detection. The control device comprises second means capable of acting upon said first means in order to level the value of said first signal after the triggering of said protection circuit.

According to the present invention it is possible to construct a control device for a switching converter with an overcurrent protection circuit that does not allow the formation of over-elongations of the converter output voltage and does not allow the converter to work at a subharmonic frequency. The control device, in the case where the converter has an inductor placed between the output terminal and the common terminal of the transistors, does not allow the formation of a high current ripple in the current present in the inductor.

BRIEF DESCRIPTION OF THE DRAWINGS

The characteristics and advantages of the present invention will become apparent from the following detailed description of a practical embodiment thereof, illustrated as a non-restrictive example in the appended drawings, in which.

DETAILED DESCRIPTION

Figure 1:
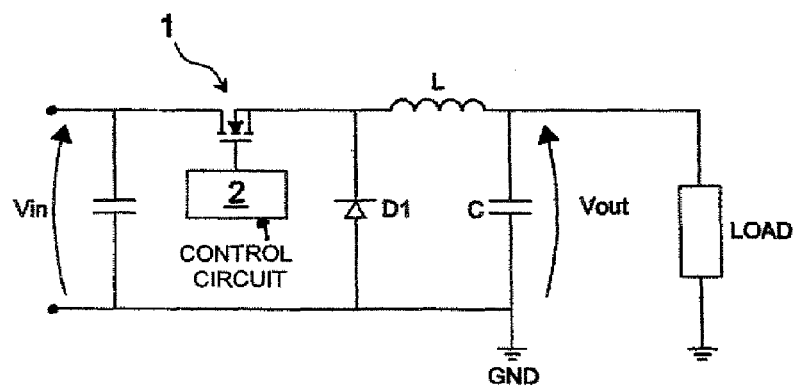
FIG. 1 is a diagram of a well-known buck converter layout.
Figure 2:
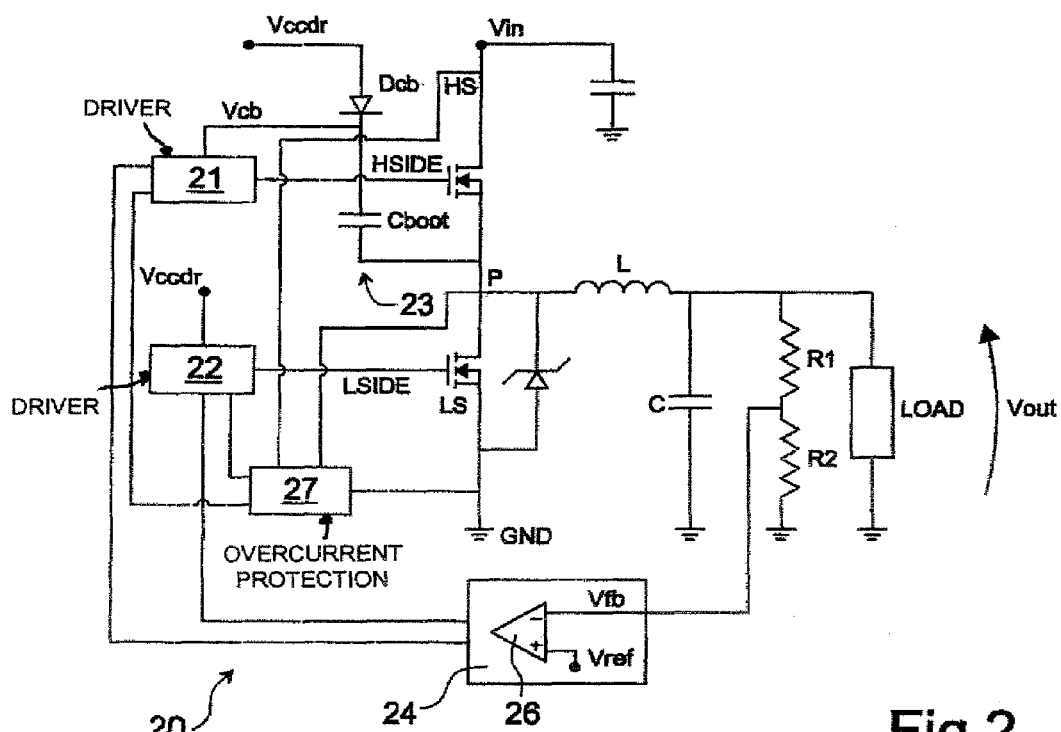
FIG. 2 is a diagram of another buck converter according to the known prior art.
Figure 3:
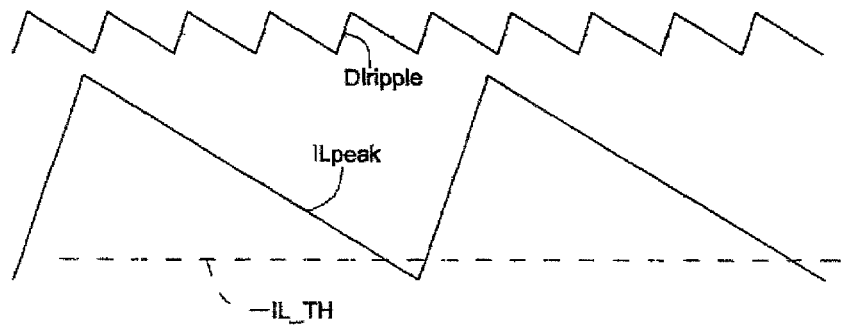
FIG. 3 shows time waveforms of signals involved with the triggering of the protection on the transistor LS where the regulation time period Ton is shorter that the time period Tmask.
Figure 4:
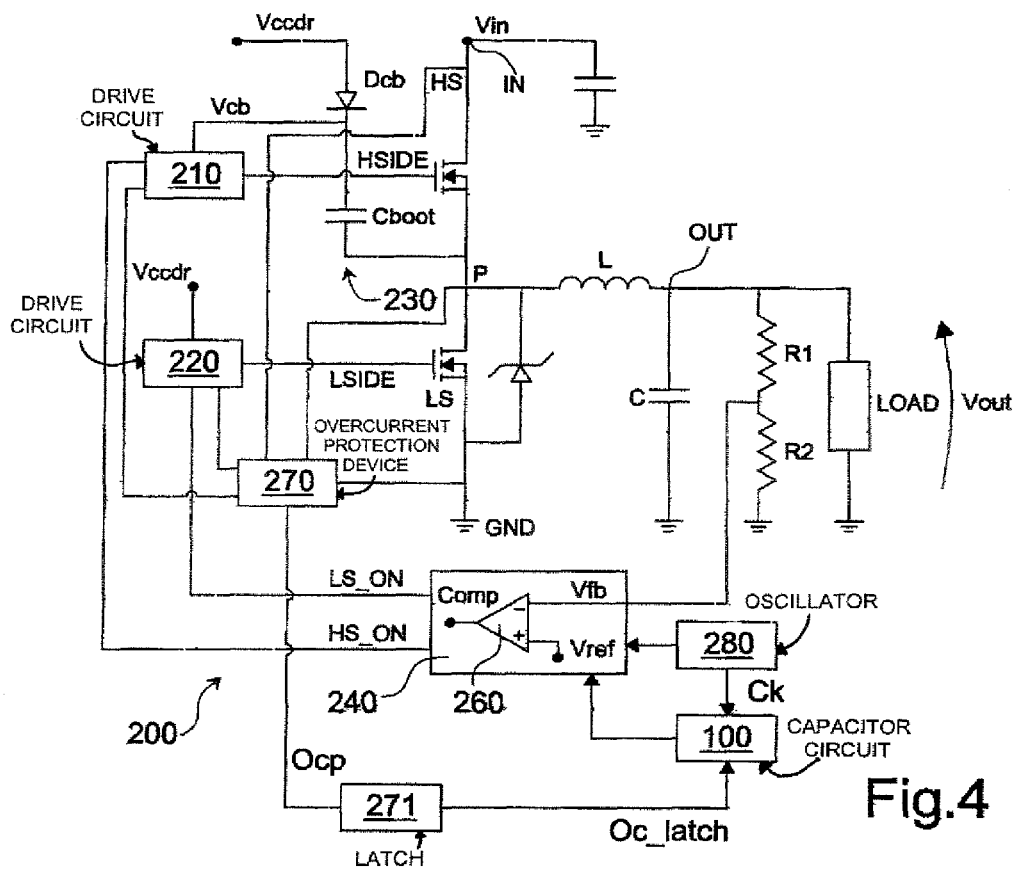
FIG. 4 is a diagram of a switching converter provided with a control device according to the present invention.

FIG. 4 shows a control device of a switching converter according, to the invention. The converter comprises a first MOS transistor HS having a non-drivable terminal connected to the input voltage Vin, present at the converter input terminal IN, and another non-drivable terminal P connected to a terminal of the inductor L and a non-drivable terminal of a second MOS transistor LS connected to ground GND, The other terminal of the inductor L is connected to the converter output terminal OUT and to the capacitor C, whose other terminal is connected to ground GND; the capacitor C is placed in parallel with the load LOAD and a resistive divider comprising a series of two resistors, R1 and R2. A fraction VFB of the output voltage Vout is input to a control device 200. The transistors HS and LS are switched on in a push-pull mode and this results in a lower power dissipation given that the voltage drop at the ends of the LS transistor is lower than the voltage drop on the diode.

The control device 200 comprises a first circuit 240 comprising in turn an error amplifier 260 suitable for comparing between the voltage VFB and a reference voltage Vref and for producing an output signal COMP and means able to effect a pulse width modulation (PWM) in response to said comparison. The control device 200 comprises two drive circuits or drivers 210 and 220 receiving as inputs the signals HS_ON and LS_ON output by the circuit 240 and which are able to drive the transistors HS and LS via the signals HSIDE and LSIDE. The driver 220 is powered by a voltage Vccdr whereas driver 210 is powered by a voltage Vcb originating from a bootstrap circuit 230 comprising a capacitor Cboot situated between the node P and the cathode of a diode Dcb having its anode connected to the voltage Vccdr.

The control device 200 comprises an overcurrent protection device 270. Said device is able to detect the current on the transistors HS and LS and to act upon the drive circuits 210 and 220, causing the transistor HS to switch off and the transistor LS to switch on upon the detection of an overcurrent.

The control device 200 comprises means 100 capable of acting upon the error amplifier 260 so as to limit the value of the output voltage COMP; the means 100 can act upon the output voltage COMP or upon the reference voltage Vref. The means 100 acts directly upon the voltage COMP or upon the reference voltage Vref; preferably said means 100 acts upon the output voltage COMP of said error amplifier 260 to limit the value thereof after the action of said protection device 270.

This serves to avoid the presence of over-elongation of the output voltage Vout after the triggering of the overcurrent protection device 270.

Moreover, since the voltage COMP is limited, the maximum switch-on time of the transistor HS is no longer limited to the time period Tmask but is regulated accordingly, thus avoiding cycle skips, the presence of subharmonics and an elevated ripple in the current.

Preferably said means 100 comprises a capacitor Cc which is charged or discharged by a fixed amount of charge at every clock strike, i.e. at every clock pulse fixed by an oscillator 280; the voltage at the ends of the capacitor Cc is coupled with the voltage COMP in order to change its value according to whether or not an overcurrent is detected.

Preferably said means 100 comprises a counter, in the event that the control device 200 is of a digital type; the value of said counter is increased or decreased at each clock pulse according to whether or not an overcurrent is detected by the device 270.

When the presence of an overcurrent is detected by the device 270, the current that flows in the inductor L is limited to IL_TH; this determines a decrease in the value of the output voltage Vout and the voltage feedback loop reacts by increasing the voltage COMP in an attempt to increase the voltage Vout. The means 100 intervenes to limit the value of the voltage COMP.

Figure 5:
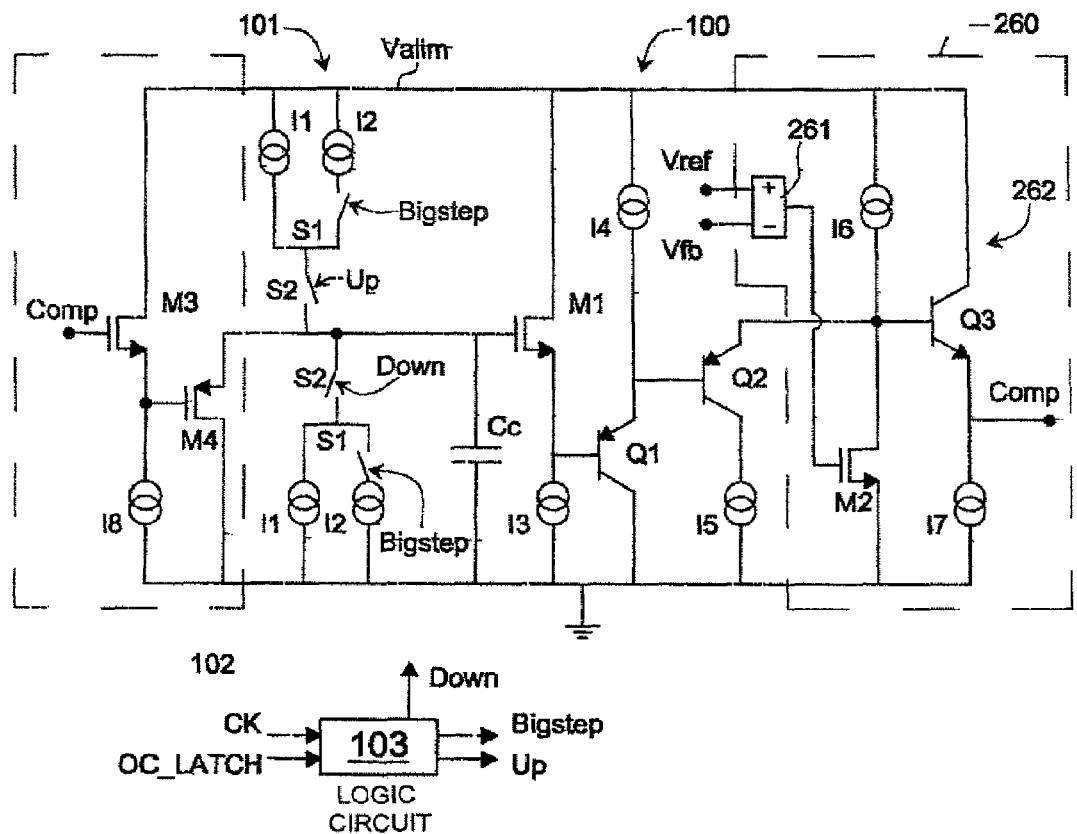
FIG. 5 is a more detailed diagram of a part of the control device of FIG. 4.

FIG. 5 shows in greater detail the means 100 in the case of analogue implementation of the control device 200. The overcurrent information OCP is normally stored in a latch 271, which may be seen in FIG. 4; the signal OC_LATCH output by said latch 271 is the signal OCP prolonged until the end of the switching cycle. The means 100 comprises a capacitor Cc connected to the gate terminal of a MOS transistor M1 having its drain terminal connected to a supply voltage Valim and its source terminal connected to a current generator I3 connected to ground GND. The source terminal of the transistor M1 is connected to a buffer, and more precisely to the base terminal of a bipolar transistor Q1 having its emitter terminal connected to a current generator I4 connected in turn with the supply voltage Valim and its collector terminal connected to ground GND. The emitter terminal of the transistor Q1 is connected to the base terminal of another bipolar transistor Q2 having its collector terminal coupled to ground GND by means of a current generator I5 and its emitter terminal connected with the error amplifier 260. The latter comprises an input stage 261 and an output stage 262; in the input stage the non-reverse input terminal is connected to the voltage Vref whereas the reverse input terminal is connected to tile voltage VFB. The output terminal of the input stage is connected to the gate terminal of a MOS transistor M2 having its source terminal connected to ground GND and its drain terminal connected to the voltage Valim via a current generator I6 and connected to the emitter terminal of the transistor Q2 and to the base terminal of a bipolar transistor Q3 having its collector terminal connected to Valim and its emitter terminal, at which the voltage COMP is present, connected to ground GND via a current generator I7. The capacitor Cc is charged and discharged by means of a charging and discharging circuit 101 comprising current generators and switches. More precisely, a first parallel arrangement of two circuit branches connected to the supply voltage Valim, and in which the first branch comprises a current generator I1 and the second branch comprises a current generator I2 connected to a switch S1 is connected via a switch S2 to a terminal of the capacitor Cc; a second parallel arrangement of two other circuit branches connected to ground GND, and in which the first branch comprises a current generator I1 and the second branch comprises a current generator I2 connected to a switch S1, is connected via a switch S2 to a terminal of the capacitor Cc. The current generators I1 and I2 generate a current equal to I and 2*I; the switches S2 are controlled by a signal BIGSTEP whereas the switch S1 of the first parallel arrangement of circuit branches is controlled by the signal UP and the switch S1 of the second parallel arrangement of circuit branches is controlled by the signal DOWN. The signals UP, DOWN and BIGSTEP are delivered by a logic circuit 103 belonging to the means 100 and receiving as inputs the signals CK and OC_LATCH.

The circuit of FIG. 5 is such as to assure that the voltage COMP is lower than the voltage given by VCc+Vgs+Vbe where VCc is the voltage at the ends of the capacitor Cc, the voltage Vgs is the voltage between the gate and source of the transistor M1 and the voltage Vbe is the voltage between the base and emitter of the bipolar transistor.

If the device 270 detects an overcurrent situation, the switch S2 driven by the signal DOWN is closed to discharge the capacitor Cc by DVCc=I*Cc for the duration of a clock pulse CK originating from the device 280; otherwise the switch S2 driven by the signal UP is closed to charge the capacitor Cc by DVCC for the duration of a clock pulse. The switches S2 controlled by the signal BIGSTEP are closed upon every entry into or exit from an overcurrent situation detected by the device 270.

More precisely, the control logic of the circuit 103 is the following: in the period of time T(n) relative to the nth cycle, if an overcurrent situation occurred in the preceding period of time T(n−1) and in the period of time just before that T(n−2), the voltage VCc is decreased by the amount DVCc; again in the period of time T(n), if an overcurrent situation occurred in the preceding period of time T(n−1) but not in the period of time just before that T(n−2), the voltage VCc is decreased by the amount 3*DVCc; again in the period of time T(n), if an overcurrent situation occurred neither in the preceding period of time T(n−1) nor in the period of time just before that T(n−2), the voltage VCc is increased by the amount DVCc; again in the period of time T(n), if an overcurrent situation did not occur in the preceding period of time T(n−1) but occurred in the period of time just before that T(n−2), the voltage VCc is increased by the amount 3*DVCc.

Figure 6:
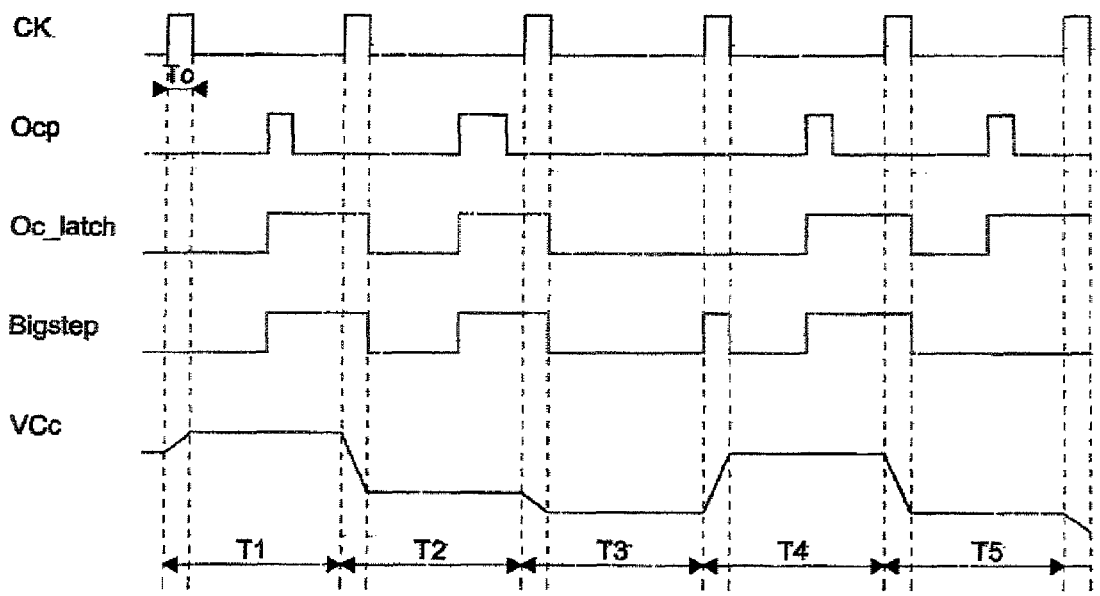
FIG. 6 shows timing diagrams of signals involved in the device of FIG. 5.

Shown in FIG. 6 are some possible patterns of the signals CK, OCP, OC_LATCH, BIGSTEP and VCc. In the period of time T1, given that the signal OCP is not high, the voltage VCc is increased by the amount DVCc for the period of time Tc of the clock pulse CK. In the period of time T2, given that the signal OCP is high, as is the signal BIGSTEP, the voltage VCc is decreased by the amount 3*DVCc for the period of time Tc of the clock pulse CK. In the period of time T3, given that the signal OCP is high but the signal BTGSTEP is low, the voltage VCc is decreased by the amount DVCC for the period of time Tc of the clock pulse CK. In the period of time T4, given that the signal OCP is low whereas the signal BIGSTEP is high, the voltage VCc is increased by the amount 3*DVCc for the period of time Tc of the clock pulse CK. In the period of time T4, given that the signal OCP and the signal BIGSTEP are high, the voltage VCc is decreased by the amount 3*DVCc for the period of time Te of the clock pulse CK.

The means 100 of FIG. 5 also comprises a circuit 102 comprising a MOS transistor having its gate terminal controlled by the signal COMP, its drain terminal connected to the voltage Valim and its source terminal connected to ground GND via a current generator I8. The source terminal of the transistor M3 is connected to the gate terminal of the transistor M4 having its source terminal connected to the gate terminal of the transistor M1 and its drain terminal connected to ground GND. The circuit 102 allows an auto-leveling of the means 100. Absent the means 102, where no overcurrent condition is detected, the voltage VCc would saturate high at the voltage Valim because at every clock pulse CK it is increased by DVCc. The presence of the means 102 guarantees the saturation of the voltage VCc at a level just slightly higher than the voltage COMP; accordingly, when an overcurrent situation is detected the means 100 will be inactive for a few clock cycles, which will be necessary in order for the voltage VCc to fall to the value COMP; with the circuit 102 the voltage VCc is leveled to the voltage COMP.

Figure 7:
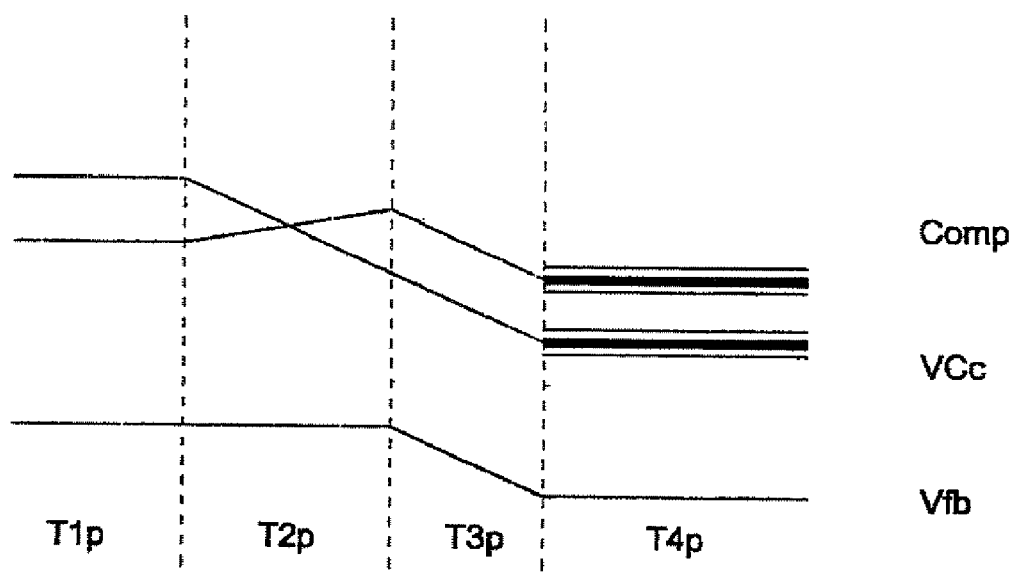
FIG. 7 shows other timing diagrams of signals involved in the converter of FIG. 4.

Shown in FIG. 7 are some possible time trends of the voltages COMP, VCc and VFB in the time periods T1$p$-T4$p$.

In the period of time T1$p$, there are normal operating conditions in which the voltage COMP is regulated by the voltage loop and the voltage VCc is linked to the voltage COMP.

In the period of time T2$p$ an overcurrent situation has been detected; the device 270 switches off the transistor HS, switches on the transistor LS and imposes a threshold current IL_TH. The voltage loop reacts by raising the signal COMP; the voltage VCc starts falling but has not yet linked to the signal COMP.

In the period of time T3$p$ the voltage signal VCc has linked to the signal COMP and forces it down; the voltage loop opens and the voltage VFB falls.

In the period of time T4$p$, the overcurrent situation having ceased, the transistors HS and LS are governed by the signal COMP, which is fixed by the signal VCc. The output voltage Vout stabilizes at a value such that IL=IL_TH and VFB=Vout.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

We claim:

1. A control device of a switching converter having an input terminal and output terminal, said converter comprising a semi-bridge of a first and second transistor coupled between the input terminal and a reference voltage, said control device comprising:

first means for detecting a signal representative of the signal on the converter output terminal and able to compare it with a reference signal and to emit a first signal in response to said comparison, said control device driving said first and second transistors based on said first signal, said control device comprising a protection circuit able to detect the presence of overcurrents in said semi-bridge and capable of acting upon said first and second transistors in response to said detection; and second means comprising a capacitor or a counter, said second means acting upon said first means in order to level the value of said first signal after the triggering of said protection circuit.

2. The device according to claim 1, wherein said second means is capable of decreasing the value of said first signal with the triggering of said protection device.

3. The device according to claim 1, wherein said switching converter comprises another circuit capable of determining the frequency of the converter switching cycles and said second means comprises a capacitor and additional means able to discharge or charge said capacitor by a first predetermined charge according to the detection or non-detection of said overcurrent by said protection circuit.

4. The device according to claim 3, wherein said additional means is able to discharge said capacitor by a second predetermined charge greater than said first predetermined charge in a given switching cycle where an overcurrent was detected in the immediately preceding switching cycle and an overcurrent was not detected in the cycle preceding said immediately preceding cycle.

5. The device according to claim 3, wherein said additional means is able to charge said capacitor by a second predetermined charge greater than said first predetermined charge in a given switching cycle where an overcurrent was not detected in the immediately preceding switching cycle and an overcurrent was detected in the cycle preceding said immediately preceding cycle.

6. The device according to claim 3, wherein said additional means is able to discharge said capacitor by said first predetermined charge in a given switching cycle where an overcurrent was detected in the immediately preceding switching cycle and in the cycle preceding said immediately preceding cycle.

7. The device according to claim 3, wherein said additional means is able to charge said capacitor by said first predetermined charge in a given switching cycle where an overcurrent was not detected in the immediately preceding switching cycle or in the switching cycle preceding said immediately preceding cycle.

8. The device according to claim 3, wherein said second means comprises an additional circuit capable of rendering the value of a voltage signal of said capacitor substantially equal to the value of said first signal.

9. The device according to claim 1, wherein said switching converter comprises another circuit capable of determining the frequency of the converter switching cycles and that said second means comprises a counter able to increase or decrease its count according to the detection or non-detection of an overcurrent by said protection circuit.

10. A switching converter having an input terminal and output terminal and including a semi-bridge of a first and second transistor coupled between the input terminal and a reference voltage and a control device, said control device comprising:

first means for detecting a signal representative of the signal on the converter output terminal and able to compare it with a reference signal and to emit a first signal in response to said comparison, said control device being suitable for driving said first and second transistors based on said first signal, said control device comprising a protection circuit able to detect the presence of overcurrents in said semi-bridge and capable of acting upon said first and second transistors in response to said detection; and second means comprising a capacitor or a counter and acting upon said first means in order to level the value of said first signal after the triggering of said protection circuit.

11. The converter according to claim 10, wherein said second means is capable of decreasing the value of said first signal with the triggering of said protection device.

12. The converter according to claim 10, further comprising another circuit capable of determining the frequency of the converter switching cycles and wherein said second means comprises a capacitor and additional means able to discharge or charge said capacitor by a first predetermined charge according to the detection or non-detection of said overcurrent by said protection circuit.

13. The converter according to claim 12, wherein said additional means is able to discharge said capacitor by a second predetermined charge greater than said first predetermined charge in a given switching cycle where an overcurrent was detected in the immediately preceding switching cycle and an overcurrent was not detected in the cycle preceding said immediately preceding cycle.

14. The converter according to claim 12, wherein said additional means is able to charge said capacitor by a second predetermined charge greater than said first predetermined charge in a given switching cycle where an overcurrent was not detected in the immediately preceding switching cycle and an overcurrent was detected in the cycle preceding said immediately preceding cycle.

15. The converter according to claim 12, wherein said additional means is able to discharge said capacitor by said first predetermined charge in a given switching cycle where an overcurrent was detected in the immediately preceding switching cycle and in the cycle preceding said immediately preceding cycle.

16. The converter according to claim 12, wherein said additional means is able to charge said capacitor by said first predetermined charge in a given switching cycle where an overcurrent was not detected in the immediately preceding switching cycle or in the switching cycle preceding said immediately preceding cycle.

17. The converter according to claim 12, wherein said second means comprises an additional circuit capable of rendering the value of the voltage signal across said capacitor substantially equal to the value of said first signal.

18. The converter according to claim 10, further comprising another circuit capable of determining the frequency of the converter switching cycles and wherein said second means comprises a counter able to increase or decrease its count according to the detection or non-detection of an overcurrent by said protection circuit.

19. A control method for a switching converter having an input terminal and output terminal, said converter comprising a semi-bridge of a first and second transistor coupled between the input terminal and a reference voltage, said control method comprising:
    detecting a signal representative of the signal on the converter output terminal and able to compare it with a reference signal and to emit a first signal in response to said comparison;
    driving said first and second transistors based on said first signal;
    providing a protection circuit able to detect the presence of overcurrents in said semi-bridge and capable of acting upon said first and second transistors in response to said detection; and
    leveling the value of said first signal after the triggering of said protection circuit using a capacitor or counter.

* * * * *